Aug. 14, 1934.    W. F. MANN    1,970,463
VALVE LOCK
Filed Jan. 6, 1934    2 Sheets-Sheet 1

INVENTOR
William F. Mann
BY
ATTORNEY

Aug. 14, 1934.   W. F. MANN   1,970,463
VALVE LOCK
Filed Jan. 6, 1934   2 Sheets-Sheet 2
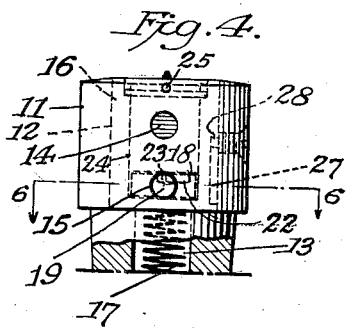
Fig. 4.
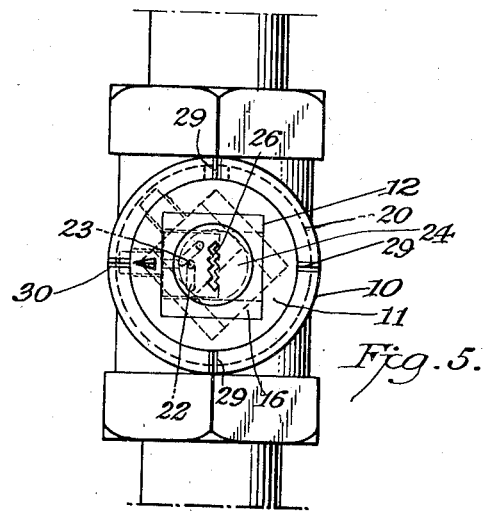
Fig. 5.
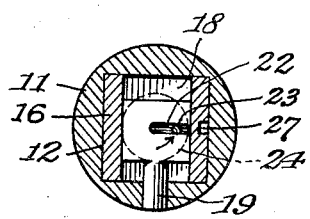
Fig. 6.
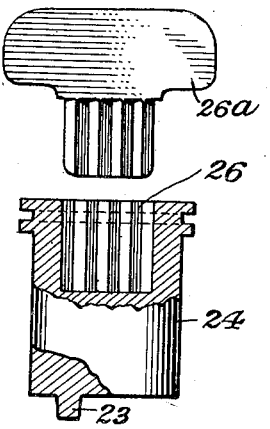
Fig. 7.
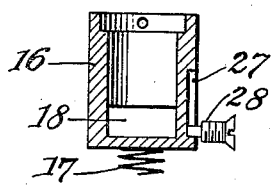
Fig. 8.
INVENTOR
William F. Mann
BY
ATTORNEY Patented Aug. 14, 1934

1,970,463

UNITED STATES PATENT OFFICE 1,970,463

VALVE LOCK

William F. Mann, El Paso, Tex.

Application January 6, 1934, Serial No. 705,579

5 Claims. (Cl. 70—124)

This invention relates to valve locks, and particularly to means for preventing the valve plug of a valve casing from being rotated; also preventing the application of power or force tending to turn the valve plug while the locking mechanism is operative.

It is the purpose of this invention to provide means associated with a valve plug adapted to be engaged by a tool or implement for turning the valve plug, novel means being provided for retaining the tool-engaging element or means in such location with respect to the valve casing or body that it can not be engaged by the aforesaid tool.

In the further description of this invention, the tool-engaging element will be referred to as a "case" and it is designed to hold a key-controlled lock and the lock is associated with instrumentalities, to be presently explained, for retaining the parts in operative and inoperative positions.

It is an object of this invention to provide a case which is held projected for engagement of a tool when the valve plug is to be turned, the said case being also associated with means for holding the said case retracted or in position to be inoperative.

It is a further object of this invention to provide a valve lock of the character indicated which will be efficient and satisfactory in use and comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the seevral views, and in which—

Figure 4 illustrates a view in elevation of the valve plug, partly in section;

Figure 5 illustrates a plan view of the valve;

Figure 6 illustrates a sectional view on the line 6—6 of Figure 4;

Figure 7 illustrates an enlarged detail view of the barrel and key; and

Figure 8 illustrates a sectional view of the case with the barrel removed.

Figure 1:
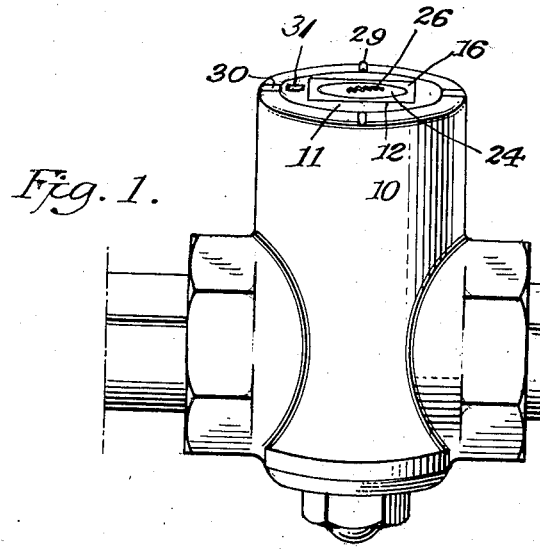
Figure 1 illustrates a perspective view of a valve in which the invention is embodied.
Figure 2:
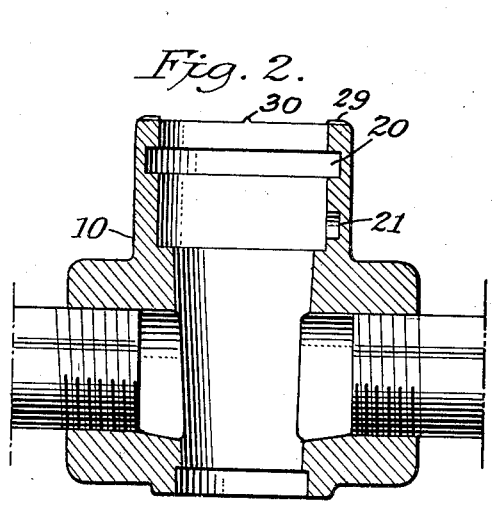
Figure 2 illustrates a sectional view of the valve casing.

In these drawings 10 denotes the valve casing which may be of any appropriate external configuration, the same being provided with a valve plug 11, and the valve plug is preferably provided with a ground joint where its external surface engages the bore of the valve casing.

The upper end of the valve plug has a recess 12 of suitable diameter and an extension recess 13 of reduced diameter. The wall of the valve plug where the diameter of the recess is larger is provided with apertures 14 and 15 and they are preferably in vertical alinement. A lock case 16 is slidable in the larger recess and the case is of such length that preferably it is wholly embedded in the said recess in order that no projecting part is available for engagement for the purpose of turning the valve plug. A spring 17 is seated in the smaller recess and bears against the under surface of the case and the said spring is operative to cause the case to project when it is released, as will presently appear. The case has a transversely disposed channel or aperture 18 in which a locking pin 19 is slidable, the said locking pin being of a length that it will project beyond the case and through the aperture 14 or 15, according to the position of the case.

The valve casing has an annular channel 20 in its inner surface near the upper end and an aperture 21 therebelow. It is the purpose of the inventor that the pin 19 shall enter the aperture 21 for the purpose of holding the case retracted and when the lock is operated, as will presently appear, the locking pin 19 is retracted to a degree that will permit the spring to force the case outwardly to the position in which it is shown in Figure 3, in which position the pin 19 will project through the aperture 14 of the valve plug into the annular channel 20 in order that the outward displacement of the case may be limited and yet the case may turn with the valve plug for the purpose of opening or closing the valve, according to the direction of rotation of the valve plug.

The case is preferably angular in cross section so that the external sides thereof may be engaged by a wrench, tool, or the like, for turning the case and of course, through the engagement of the locking pin with the case and valve plug, the valve may be manipulated.

The locking pin has a transversely disposed slot 22 which is engaged by an eccentrically positioned pin 23 on the lower end of the lock barrel 24, which lock barrel is located in the case, the said lock barrel being held in the case by set pins such as 25 which extend into an annular groove 25ª on the outer surface of the lock barrel. The lock barrel will, of course, have a keyhole 26 and will be rotated by a key such as 26ª located in the hole so that when the key is turned, the locking pin will be retracted or projected, according to the direction of rotation of the key. The external surface of the case has a longitudinally disposed slot 27 extending upwardly from near its lower end and the inner end of a set screw 28 projects into the slot and limits the outward movement of the case.

Figure 3:
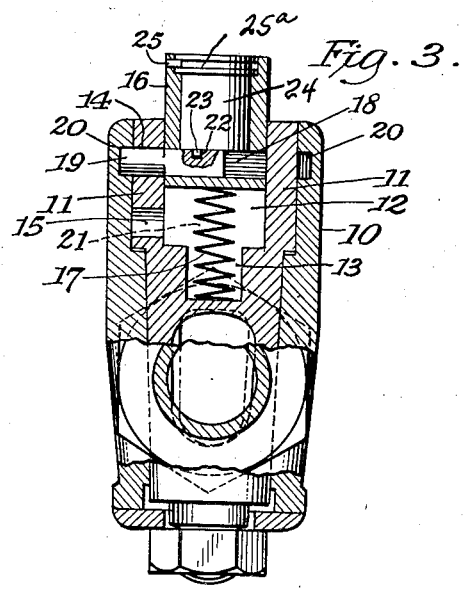
Figure 3 illustrates a sectional view through the valve with the parts in one position of adjustment.

From an inspection of the drawings and from the foregoing description, it will, it is thought, be apparent that when the key is manipulated to retract the locking pin from the position in which it is shown in Figure 3, the case may be pressed inwardly until it is wholly seated in the valve plug, in which position the pin will be in alinement with the aperture 15 and the aperture 21 for the reception of the locking pin 19. By operating the key so that the locking pin is projected, the parts will be locked in inoperative positions. When the key is again manipulated to retract the locking pin, the spring will force the case outwardly, it being understood that the key will then be manipulated to again project the locking pin into the aperture 14 and the annular channel 20, in which position the valve plug will be turned and of course the operations may be repeated.

Suitable external indicating means such as 29 and 30 may be formed on the valve casing with relation to which the valve plug may be turned so that when a marking 31 on the valve plug registers with one of the indicating means on the valve casing, the valve will be open, whereas when the marking 31 on the valve plug registers with the other indicating means on the valve casing, the valve will be closed. This is of course an arbitrary arrangement which may be changed to suit particular requirements.

I claim

1. In a valve, a valve casing, a valve plug therein for controlling ports of the casing, the said valve plug having a recess in its outer end and transversely disposed apertures, said valve casing having an annular recess near its outer end and an aperture therebelow, a lock casing having a chamber for a suitably operated lock barrel and a transversely disposed channel therebelow merging with it, a locking pin in the channel, said locking pin having a slot, a lock barrel rotatable in the casing, and means by which the movement of the lock barrel is communicated to the pin to project and retract the same, the external surface of said case being angular in cross section.

2. In a valve, a valve casing, a valve plug therein for controlling ports of the casing, the said valve plug having a recess in its outer end and transversely disposed apertures, a lock casing having a chamber for a suitably operated lock barrel, means for holding the case retracted in the valve plug, and means operated by the lock barrel for actuating the aforesaid means.

3. In a valve, a valve casing, a valve plug rotatably mounted therein and operative to guard the ports of the valve casing, said plug having a recess in its outer end, and the said valve plug having transversely disposed apertures merging with the recess, the said valve casing having an annular channel near its outer end and an aperture therebelow merging with its inner surface, a casing slidable in the recess of the valve plug, said casing having a seat for a lock barrel and a transversely disposed opening merging therewith, a locking pin slidable in the opening, a lock barrel in the casing having a projection on its lower surface, the said locking pin having a recess to receive the said projection whereby rotation of the lock barrel reciprocates the said pin, means for projecting the case outwardly, means for limiting its outward movement, and means associated with the case adapted to be engaged for manipulating the valve plug.

4. In a valve, a valve casing, a valve plug therein for controlling ports of the casing, a case rotatably mounted in the valve plug, means for communicating the motion of the case to the valve plug, and for holding the case in different positions of adjustment, a lock in the case, and means for communicating the motion of the lock to the first mentioned means.

5. In a valve, a valve casing, a valve plug therein for controlling ports in the casing, a case rotatably mounted in the valve plug, means for communicating the motion of the case to the valve plug and for holding the case in different positions of adjustment, a lock in the case, means for communicating the motion of the lock to the first mentioned means, and means on the case adapted to be engaged by a tool for turning the said case and valve plug.

WILLIAM F. MANN.